Figure 1:
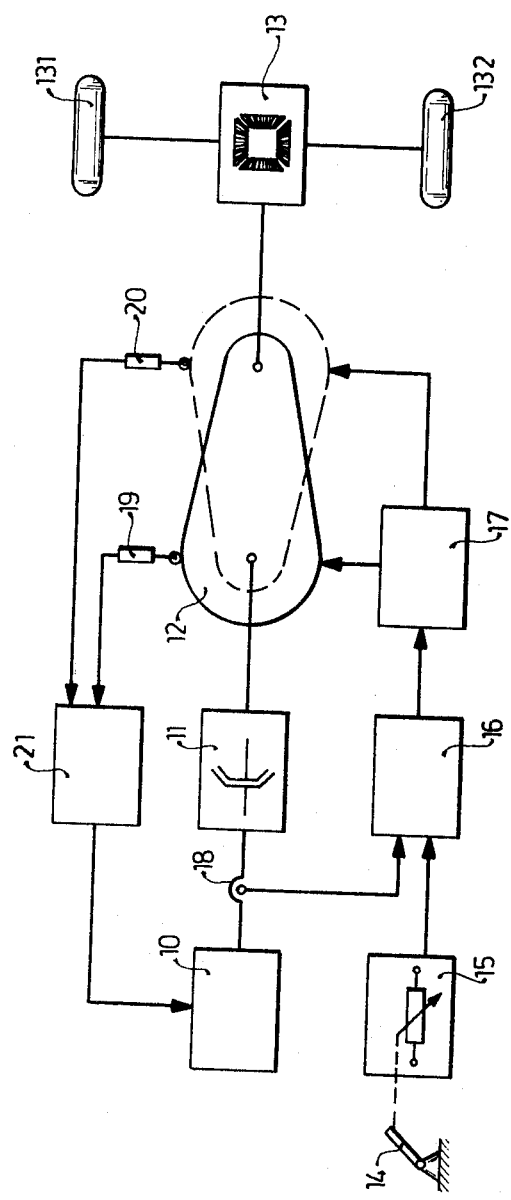

United States Patent [19]

Kofink

[11] 4,246,807
[45] Jan. 27, 1981

[54] APPARATUS FOR CONTROL OF A CONTINUOUSLY VARIABLE BELT DRIVE FOR OPERATING A VEHICLE

[75] Inventor: Wolfgang Kofink, Aichwald-Schanbach, Fed. Rep. of Germany

[73] Assignee: Robert Bosch GmbH, Stuttgart, Fed. Rep. of Germany

[21] Appl. No.: 860,572

[22] Filed: Dec. 14, 1977

[30] Foreign Application Priority Data

Dec. 24, 1976 [DE] Fed. Rep. of Germany ....... 2658719

[51] Int. Cl.³ ................. B60K 41/14; F16H 55/56
[52] U.S. Cl. ................. 74/872; 74/190.5; 474/18
[58] Field of Search ............ 74/856, 857, 859, 861, 74/865, 866, 872, 335, 336 B, 337, 190.5, 230.17 M

[56] References Cited

U.S. PATENT DOCUMENTS

| | | |
|---|---|---|
| 1,993,544 | 3/1935 | Fleischel .............................. 74/865 |
| 2,150,456 | 3/1939 | Perrine ............................. 74/336 B |
| 3,034,368 | 5/1962 | Wingbermuhle et al. ... 74/230.17 M |
| 3,794,133 | 2/1974 | Sugiura et al. ..................... 74/866 |
| 3,835,733 | 9/1974 | Wurst .............................. 74/866 |
| 3,927,528 | 12/1975 | van der Kolk et al. .............. 74/861 |

FOREIGN PATENT DOCUMENTS

| | | |
|---|---|---|
| 1254981 | 8/1960 | Fed. Rep. of Germany ............. 74/859 |
| 1917291 | 10/1970 | Fed. Rep. of Germany ............. 74/866 |
| 2404666 | 8/1974 | Fed. Rep. of Germany ............. 74/861 |
| 2625770 | 12/1977 | Fed. Rep. of Germany ............. 74/861 |

*Primary Examiner*—Allan D. Herrmann
*Attorney, Agent, or Firm*—Frishauf, Holtz, Goodman & Woodward

[57] ABSTRACT

A drive motor that may be an internal combustion engine or an electric motor is operated at substantially constant speed or, in the case of an internal combustion engine, at one of two substantially constant speeds. The speed of travel of the vehicle under various load conditions is varied by a drive control pedal operating a transducer that furnishes one input to a signal processor while a torque transducer in the engine drive shaft provides a second input to the processor. The processor output controls the positioning device that determines the transmission ratio of a continuously variable belt drive transmission by pressing together the halves of one pulley of the belt drive while separating the halves of the other pulley, varying their effective diameter with respect to the wedge-shaped belt in opposite directions. When an internal combustion engine is used as the drive motor, the engine speed can be selectably the maximum-torque speed or the maximum-power speed and the selection can be made automatic by means of limit switches operating at the respective extremes of the variable belt drive control range. When an electric motor is used as the drive motor, a compound-wound motor is operated at a speed in the transition range between behavior mainly as a series-wound motor and behavior mainly as a shunt-wound motor.

5 Claims, 2 Drawing Figures

APPARATUS FOR CONTROL OF A CONTINUOUSLY VARIABLE BELT DRIVE FOR OPERATING A VEHICLE

This invention concerns the control of the drive power applied to a motor vehicle by controlling a continuously variable belt drive coupling the motor of the vehicle to the drive wheel.

A variety of power-driven vehicles are known in which the transmission, interposed between the motor shaft and the common drive shaft of the usual two driven wheels, is a continuously variable belt drive, sometimes called a stepless belt drive. In such variable belt drives, a wedge-shaped belt runs over two belt pulleys of which one is connected with the drive shaft of the motor and the other with the driven shaft. The spacing of halves of each pulley is variable, so that the circumferences over which the belt is engaged in the belt pulleys can be adjusted. In this manner the transmission ratio of such a stepless belt drive can be varied over a wide range, this being known sometimes as a variator drive, since the transmission ratio is determined by the ratio of the circumferences with which the belt is in grasping contact with the respective pulleys. Stepless belt drives have been used both in vehicles driven by an internal combustion engine and in vehicles utilizing an electric motor drive.

U.S. Pat. No. 3,202,234 disclosed a vehicle driven with an electric motor in which the driving forces are transmitted to the wheels through a stepless belt drive. It was intended in this manner to prevent drawing heavy current from the vehicle batteries, especially upon heavy loading of the vehicles on up-grades. U.S. Pat. No. 3,424,261 discloses another motor vehicle with a stepless variable belt drive in which the belt pulley on the drive side of the transmission is regulated by a centrifugal control depending on the motor speed, and the centrifugal control additionally actuates a clutch between the driving motor and the belt pulley on the drive side of the transmission. In an extension of the invention disclosed in the aforesaid U.S. Pat. No. 3,424,261, the vehicle is shown as driven with an internal combustion engine. The disadvantage of the known vehicles of the type here discussed is that they are driven by a motor of variable speed, which in the case of internal combustion engines involves unfavorable emission volume of noxious material and in the case of electric motor drives requires a wide range of motor speed.

The Present Invention

It is an object of the present invention to provide a control for a variable stepless belt drive in a motor vehicle powered by a motor that runs either at constant speed or at one of two constant speeds, so as to make possible the reduction of the emission of noxious material in the case of internal combustion engines and to enable more efficient cost-effective utilization of an electric motor in the case of electric motor drive.

Briefly, the transmission ratio of the continuously variable belt drive is controlled by the electrical output signal of a signal processor stage responsive to the signals of two transducers, one of them a transducer for converting the torque applied by the drive shaft of the driving motor to a corresponding electrical signal and the other using an electrical signal corresponding to the position of a control pedal.

When the driving motor is an internal combustion engine, it is preferably provided with regulating means to maintain the engine speed at at least one constant speed and preferably the engine is provided with means for maintaining it either at the speed at which the torque applied by the drive shaft of the engine is a maximum or at another constant speed at which the power delivered by the engine is a maximum. In such an arrangement, limit switches are provided on the variable belt drive, so that at the lowest transmission ratio of the belt drive transmission switching is automatically produced from the maximum-torque regulated speed to the maximum-power regulated speed, while at the highest transmission ratio of the variable belt drive transmission, switching is automatically provided from regulation of the engine at its maximum-power speed to regulation of the engine at its maximum-torque speed.

In the case of an electric motor drive, the electric motor used has a compound field winding and means are provided for regulating its speed at a constant value in the transition range between the speed range in which the electric motor operates essentially as a series-wound motor and the speed range in which the electric motor operates essentially as a shunt-wound motor.

The present invention has the advantage that the engine can be operated at a constant speed, so that it is possible in the case of a gasoline engine to maintain the speed at which the emission of noxious material is at a minimum, whereas in the case of an electric motor drive to construct the electric motor in an optimum fashion for a fixed motor speed, resulting in reduction of the space requirements of the motor and making possible manufacture in a more cost-effective way.

In the preferred embodiment of the invention in which an internal combustion motor is used to drive the vehicle, it is possible to perform city driving with a motor speed corresponding to maximum torque and overland driving with a motor speed corresponding to maximum power delivery. In that manner, it is possible to obtain the most favorable exhaust emission characteristics in city driving and particularly good fuel economy in country driving.

The preferred type of electric motor and speed control above mentioned for the case of an electric motor drive in the system of the invention has the advantage of operating the electric motor all the time in a high efficiency range.

DRAWINGS, ILLUSTRATING AN EMBODIMENT

Figure 2:
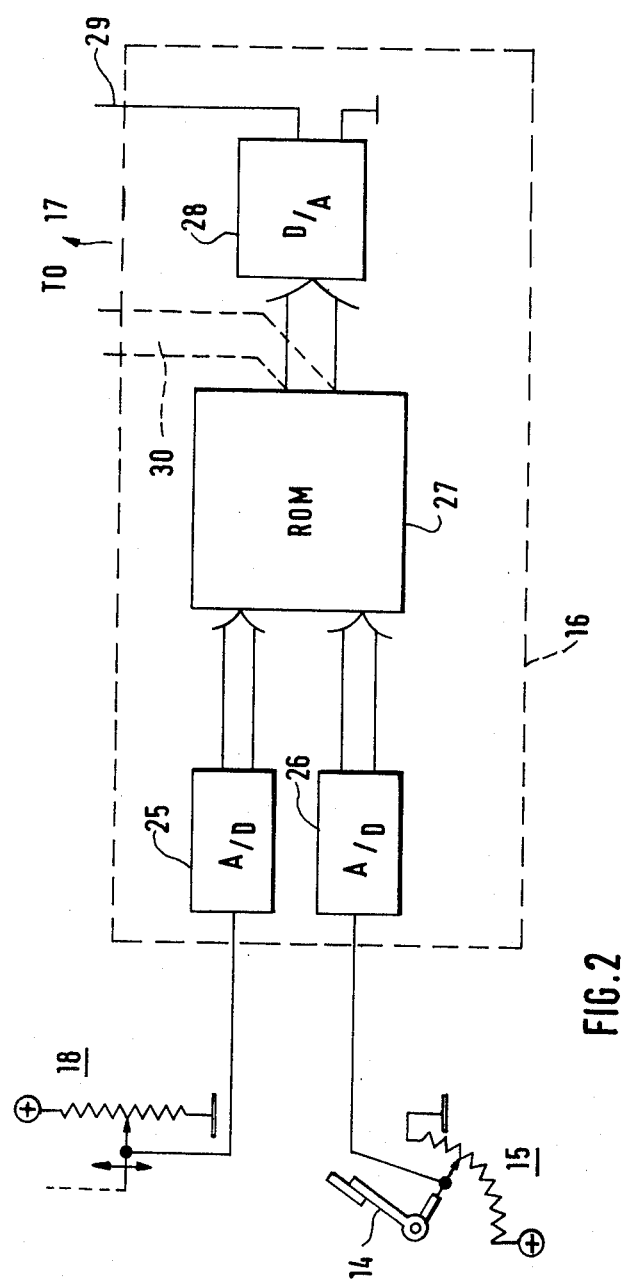

FIG. 1 is a basic block diagram of a motor vehicle having a stepless variable belt drive controlled in accordance with the invention, and FIG. 2 is a diagram of one form of signal processor utilizable as the signal processor 16 of FIG. 1.

As shown in FIG. 1, a drive motor 10 is connected through a drive shaft and a clutch 11 to a stepless variable belt drive 12. The output side of the belt drive 12 works through a differential 13 to turn the wheels 131 and 132. A command transducer 15, which may for example be a variable resistor or a potentiometer suitably energized, responds to the control positioning of the pedal 14 which is intended to be operated in the usual manner of an accelerator pedal controlling an engine throttle, but in this case an electrical signal corresponding to the position of the pedal 14 is furnished to a processing stage 16, which has another input connected to the output of a torque-responsive transducer 18, the mechanical side of which is interposed in or mounted on the drive shaft between the drive motor 10 and the clutch 11.

The output of the processor circuit 16 is connected to a double-acting positioning device 17 that comprises means for varying the spacing of the halves of each of the belt pulleys of the belt drive, in such a way that the halves of one pulley are spread apart to reduce the effective diameter at the same time that the halves of the other are pressed together to increase the effective diameter. As mentioned before, mechanisms of this type are known and need not be further described here. A first limit switch 19 is provided adjacent to the input pulley of the belt drive and a second limit switch 20 is provided adjacent to the belt pulley on the output side of the belt drive, the limit switches being positioned so as to respond when the respective pulleys reach maximum effective diameter, which is to say minimum spacing between halves of the pulley. The limit switches 19 and 20 are connected to a switchover stage 21 the condition of which affects the operation of the drive motor 10, as more particularly mentioned below.

The drive motor 10 is operated at approximately or substantially constant speed. In order to enable the motor vehicle to accommodate to varying load conditions and to the commanded speed of travel set by the pedal 14, the control adjustment of the pulleys of the variable belt drive is called into play. This is provided for in such a way that the load condition of the vehicle is sensed by the torque transducer 18 at the drive shaft of the drive motor 10 to produce an electrical signal while the command transducer 15 produces a second electrical signal representing the prescribed speed and corresponding to the position of the pedal 14, and these two electrical signals are supplied to the processor stage 16. Since the drive motor 10 is driven at substantially constant speed, the motor vehicle can operate at high speeds only with small motor torque and likewise can operate at high torque only at low speeds. In accordance with these basic facts, to the operating data of the drive motor 10 and to the characteristic of the variable belt drive 12, an output control signal is produced in the processing stage 16 supplied to the electrical side of the control mechanism 17 that mechanically sets the spacing between the halves of each of the pulleys of the stepless variable belt drive 12 in the manner already described. The positioning device 17 is preferably a hydraulic drive controlled by a magnetic valve and equipped with an electrical feedback for comparison with the input signal so as to assure faithful positioning in accordance with the control signal produced by the processing stage 16, such arrangements being well known for providing a precision of positioning with adequate mechanical power, but of course in light-duty equipment, such as a golf cart, a simpler electro-magnetic positioning device operating against a spring might be usable. One form of circuit suitable for the processor 16 is described below with reference to FIG. 2. In the manner described above, an automatic accommodation of the power transfer within the motor vehicle to whatever load condition, within the capabilities of the vehicle, is present, and with the position of the driver-controlled pedal 14, is made possible. As already mentioned, this accommodation of the drive motor to its task can be performed in the manner above described whether the motor is a gasoline or Diesel engine or whether it is an electric motor operated from a vehicle battery.

In a particularly preferred embodiment of the invention, the drive motor 10 is an internal combustion engine that is selectively driven either at the engine speed that corresponds to maximum output torque or at the engine speed that corresponds to maximum power delivery. In the first of these two cases, there is a minimum amount of noxious emission and in the second case, the vehicle can be driven at the greatest possible power level. For this reason, operation at maximum torque is particularly suitable for city driving, whereas operation at maximum power delivery is particularly suitable for highway driving. The utility of this preferred embodiment is not limited to wheeled vehicles and could be used for marine propulsion of a launch driven by a Diesel engine that can be switched between running at its most economical speed and running at maximum power.

In a further development of the invention with regard to the operation of an internal combustion engine as the drive motor 10 at one of two selectable engine speeds, the selection of engine speed is not made manually but rather automatically. In this case the first limit switch 19 is provided to respond when the input pulley of the variable belt drive reaches its maximum effective diameter and the limit switch 20 is provided to respond when the output pulley of the variable belt drive reaches its maximum diameter. The terminals of the limit switches 19 and 20 are connected to the switching stage 21 that switches over the internal combustion engine utilized as the drive motor 10 from its first speed that corresponds to maximum torque to its second speed that corresponds to maximum power output, and back. In the case of internal combustion engines, the first speed corresponding to maximum torque usually lies below the second speed that corresponds to maximum power. If, for instance, the engine is operating at its first speed and the variable belt drive has reached its lowest value of transmission ratio ("highest gear"), the first limit switch 19 is actuated and the engine is switched by the switching stage 21 to the second and higher speed. If the engine, on the other hand, is operating at its second and higher speed and the variable belt drive reaches the highest possible value of transmission ratio ("lowest gear"), the second limit switch 20 is operated and the engine is switched over by the switching stage 21 to its first and lower operating speed. The characteristic logic of the switching stage 21 is so simple that it need not be further described. Its output device depends of course on the nature of the speed regulation system used for maintaining the engine either at its maximum torque speed or at its maximum power speed. If an entirely mechanical system is used for speed control, the output of the switching stage 21 can be a simple two-position electromagnetic device, whereas if the speed control system is at least partly electrical the output stage of the switching device 21 can be a relay or an electronically controlled switch or two.

In another embodiment of the invention, the drive motor 10 is an electric motor. This electric motor can, for example, be a dc motor having a compound characteristic of the kind in which the course of the relation of torque to motor speed has one region where the motor operates as a series-wound motor and another region where the motor operates as a shunt-wound motor. Such motors are typically compound-wound motors having both a series field winding and a shunt field winding. It is possible to operate such a motor at a speed that corresponds more or less to the transition between series-wound behavior and shunt-wound behavior of the motor.

FIG. 2 shows one form of a processing circuit 16 for use in the system of FIG. 1. As illustrated in FIG. 2, both the torque transducer 18 and the command transducer 15 are provided in the form of potentiometers supplying analog electrical signals representative of the engine torque in one case and the position of the pedal 14 in the other case. The outputs of these tranducers are respectively provided to the analog-to-digital converters 25 and 26 which provide digital address signals to the read-only memory 27. Available read-only memories may contain vast amounts of data written therein by a photolithographic process in the last stage of manufacture in accordance with precise information specifications provided by the user-customer. The information can be readily computed in a simple fashion from whatever curve is required for the operation of the positioning device 17 of the continuously variable belt drive, which will depend to some extent on the mechanical constitution of the variable belt. In general, depression of the pedal 14 would provide signals addressing the ROM in such a way as to provide an output that would cause the positioning member 17 to reduce the transmission ratio of the variable belt drive (towards "higher gear"), but reduction of the torque delivered by the engine as the result of greater loading would modify the addressing of the ROM 27 to counteract the effect just mentioned and prevent reduction of the transmission ratio or even increase the transmission ratio as in the case when the position of the pedal 14 remains constant and the engine, either in the case of single speed engine operation or in the case of an engine operating at its maximum power speed, is not capable of causing the vehicle to climb the hill at the speed set by the pedal 14.

The output of the ROM 27 is converted to an analog signal by the digital-to-analog converter 28, since an analog signal particularly suitable for operating a continuously (stepless) variable belt drive. The analog signal is provided on the wire 29 which operates the device 17. In the case where the device 17 is a hydraulically controlled device under electric control with feedback, as already discussed, the feedback can of course be provided in digital form, in which case the control of the system can be provided by a digital output from the ROM 27, as indicated by the multibit output 30 shown in FIG. 2 in broken lines.

Although the invention has been described with reference to specific illustrative embodiments, it is evident that variations and modifications may be made within the inventive concept. As already suggested, in the application of the invention, a reference to operating at least one driven wheel through a variable belt drive driven by a drive motor of a vehicle must be understood as including under the term "wheel" a screw propeller in case the vehicle is a marine vehicle.

It may be assumed for the purpose of the above explanation that the clutch 11 is operated with an individual pedal not shown in FIG. 1, but of course it is to be understood that a well-known form of automatic clutch may be used which will allow the engine to run idle when the vehicle is braked to a stop.

I claim:

1. An apparatus for operating a vehicle equipped with a stepless variable belt drive coupling a motor having a drive shaft to at least one drive wheel of said vehicle, said motor and belt drive being mounted in said vehicle, said apparatus further comprising:
   means for operating said motor at a first constant speed ($n_2$) at which the power delivered by said motor to said drive shaft is substantially a maximum;
   means for operating said motor at a second constant speed ($n_1$) at which the torque applied by said motor to said drive shaft is substantially a maximum;
   changeover switching means for enabling one of said constant speed operating means at a time and for transferring operation of said motor between said first and second constant speeds;
   a torque responsive transducer (18) for producing an electrical signal representative of the torque transmitted by said drive shaft;
   a second transducer (15) mechanically connected to a control pedal for producing an electrical signal representative of the position of said control pedal;
   an electric signal processing circuit (16) for producing a control signal in response to and taking account of the respective magnitudes of both said signal produced by said torque-responsive transducer and said signal produced by said second transducer;
   means (17) responsive to said control signal for determining the drive transmission ratio of said stepless variable belt drive;
   means for operating said changeover switching means to enable said maximum power constant speed operating means in response to the condition of said stepless variable belt drive corresponding to a first drive transmission ratio thereof and for operating said changeover switching means to enable said maximum torque constant speed operating means in response to the condition of said stepless variable belt drive corresponding to a second drive transmission ratio thereof which is greater than said first drive transmission ratio.

2. A motor vehicle operating apparatus as defined in claim 1, in which said means for operating said change over switching means comprises first and second limit switches (19, 20) responsive to respective extreme conditions of said variable belt drive (12) and connected in a switching circuit (21) for operating said switching means to enable said maximum power constant speed operating means when the region of the smallest possible drive transmission ratio of said variable belt drive is reached while said engine is operating at its maximum torque speed ($n_1$) and for operating said switching means to enable said maximum torque constant speed operating means when the region of the largest possible drive transmission ratio of said variable belt drive is reached with operation of said engine at its maximum power speed ($n_2$).

3. A motor vehicle operating apparatus as defined in claim 1, in which said motor is an internal combustion engine.

4. A motor vehicle operating apparatus as defined in claim 1, in which said motor is an electric motor.

5. A motor vehicle operating apparatus as defined in claim 4, in which said electric motor is a compound-wound motor and means are provided for regulating its speed so as to maintain substantially constant speed having a value in the transition range between behavior of the motor primarily as a shunt-wound motor.

* * * * *